United States Patent
Choi et al.

(10) Patent No.: US 8,374,542 B2
(45) Date of Patent: Feb. 12, 2013

(54) DATA TRANSMISSION SYSTEM FOR FORWARDING DATA USING A PLURALITY OF ANTENNAS

(75) Inventors: Jun Il Choi, Seoul (KR); Chang Soon Park, Chungju-si (KR); Ki-Hong Park, Suwon-si (KR); Young-Chai Ko, Seoul (KR); Jin Hee Lee, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 0 days.

(21) Appl. No.: 13/556,895

(22) Filed: Jul. 24, 2012

(65) Prior Publication Data

US 2012/0289150 A1 Nov. 15, 2012

Related U.S. Application Data

(62) Division of application No. 12/466,060, filed on May 14, 2009, now Pat. No. 8,254,830.

(30) Foreign Application Priority Data

Nov. 4, 2008 (KR) ........................ 10-2008-0108830

(51) Int. Cl.
*H04B 3/36* (2006.01)

(52) U.S. Cl. ............. 455/7; 455/561; 370/315; 370/328
(58) Field of Classification Search ............... 455/7, 561; 370/315, 328
See application file for complete search history.

(56) References Cited

U.S. PATENT DOCUMENTS

| 8,023,445 B2 * | 9/2011 | Jung et al. ..................... 370/315 |
| 2004/0192204 A1 | 9/2004 | Periyalwar et al. |
| 2008/0013520 A1 | 1/2008 | Liu et al. |
| 2008/0056175 A1 | 3/2008 | Jung et al. |

FOREIGN PATENT DOCUMENTS

| KR | 10-2008-0016549 | 2/2008 |
| KR | 10-2008-0038966 | 5/2008 |
| KR | 10-2008-0054422 | 6/2008 |

* cited by examiner

*Primary Examiner* — Lincoln Donovan
*Assistant Examiner* — Shikha Goyal
(74) *Attorney, Agent, or Firm* — NSIP Law

(57) ABSTRACT

A data transmission system transmitting data using a relay is provided. The relay selects a transmission terminal from a plurality of terminals connected to a base station. During a first time slot, the base station transmits base station data to the relay and the transmission terminal transmits terminal data to the relay. The relay transmits the terminal data to the base station and transmits the base station data to the transmission terminal during a second time slot.

3 Claims, 9 Drawing Sheets

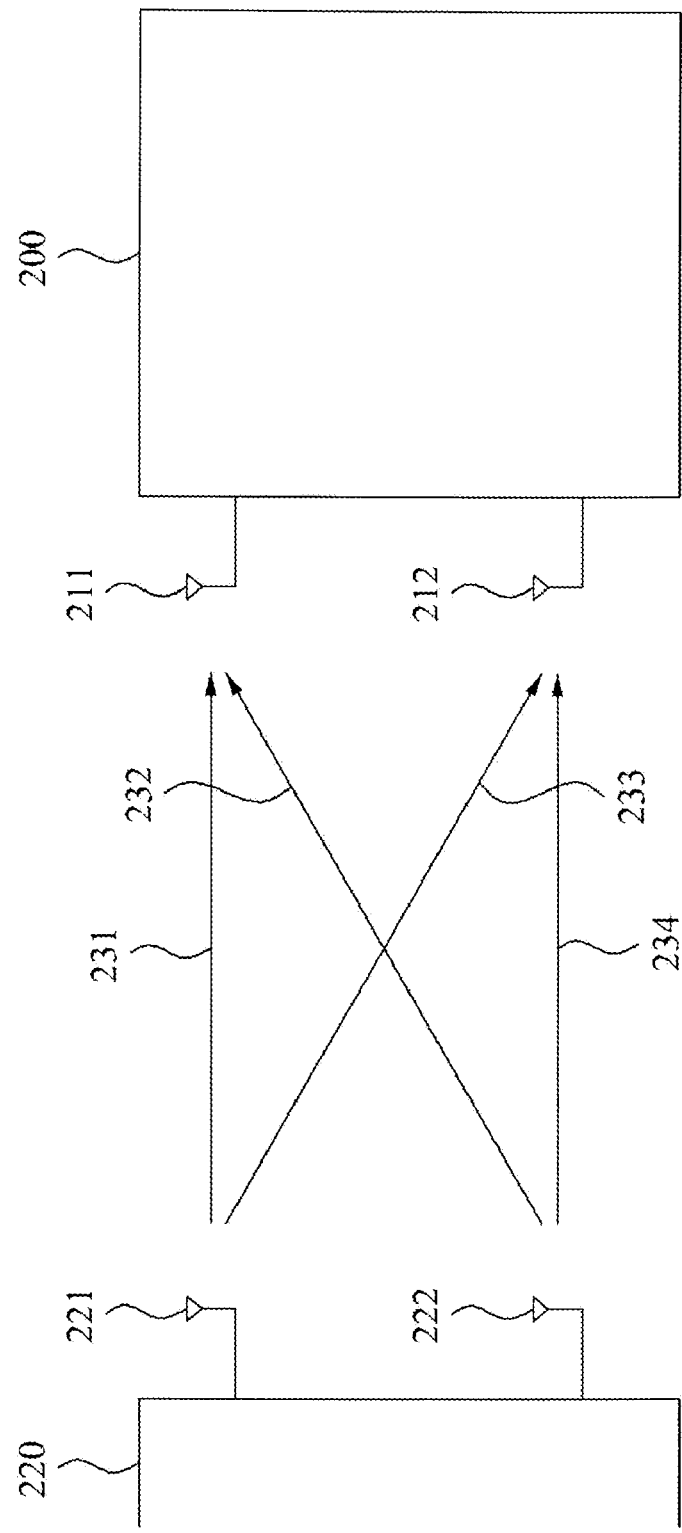

DATA TRANSMISSION SYSTEM FOR FORWARDING DATA USING A PLURALITY OF ANTENNAS

CROSS-REFERENCE TO RELATED APPLICATION

This application is a divisional application of U.S. patent application Ser. No. 12/466,060, filed on May 14, 2009, which claims the benefit under 35 U.S.C. §119(a) of Korean Patent Application No. 10-2008-0108830, filed Nov. 4, 2008, in the Korean Intellectual Property Office, the entire disclosure of which is incorporated herein by reference.

BACKGROUND

1. Field

The following description relates to an apparatus and method for transmitting data to a relay for forwarding received data to a data receiving apparatus and a method for forwarding data.

2. Description of Related Art

Recently active research is being conducted in wireless communications for the purpose of providing various multimedia services, including voice service, and supporting high quality and high speed data transmission. As a part of those studies, there have been significant developments in the techniques related to a multiple input multiple output (MIMO) communication system using spatial channels.

MIMO techniques utilize multiple antennas that provide high data transmission rates by increasing a channel capacity within limited frequency resources. MIMO techniques use multiple transmission and receiving antennas in a channel environment enriched with scattering objects. Conceptually, MIMO techniques are capable of providing channel capacity enhancements proportional to the number of antennas with fewer quantities between receiving antennas and transmission antennas.

To expand the coverage of a specific base station, there is active research in techniques utilizing relays. Terminals make connections to the relays, and the relays transmit data to a base station after receiving the data from the terminals.

However, when relays are included in a communication system, wireless resources are required for the relays, such as time slots and the like. As an example, assume that a relay operates between a base station and a terminal The base station transmits a message A to a relay during a time slot T1 (which is one of the downlink time slots), and a terminal transmits a message B during a time slot T2, (which is one of uplink time slots). In this instance, the relay transmits the message A to the terminal during a time slot T3, which is one of the downlink time slots, and transmits the message B to the base station during the time slot T4, which is one of uplink time slots.

In the above described example, to transmit the message A from the base station to the terminal via the relay and to transmit the message B from the relay to the base station, at least 4 time slots are utilized, such as T1, T2, T3, and T4. When the base station and the terminal directly transmit and receive the messages A and B without using the relay, only two time slots are utilized. Therefore, it appears as though more wireless resources are consumed when relays are added to a communication system.

Consequently, a technique which may maximize a data transmission rate by reducing consumption of wireless resources, such as time slots, even when adding relays in a communication system may be desired.

SUMMARY

In one general aspect, a relay includes a channel estimation unit to estimate a wireless channel state from a plurality of transmission antennas in a base station to a plurality of receiving antennas in a relay, and to generate a channel state matrix based on the estimated wireless channel state; a transmission terminal selection unit to select at least one transmission terminal based on the channel state matrix from among a plurality of terminals connected to the relay; a receiving unit to generate a received vector including terminal data received from the at least one transmission terminal and base station data received from the base station; a decoding unit to decode a sum of the terminal data and the base station data based on the channel state matrix and the received vector; and a transmission unit to transmit the decoded sum of the terminal data and the base station data to both of the base station and the transmission terminals.

The receiving unit may receive pilot signals from each of the plurality of transmission antennas, and the channel estimation unit may generate the channel state matrix based on each of the pilot signals.

The relay also may include a singular value decomposition unit to perform singular value decomposition with respect to the channel state matrix; and a channel state vector generation unit to generate a channel state vector with respect to wireless channels from the relay to each of the plurality of terminals, where the transmission terminal selection unit may be configured to compare each column of a left singular matrix of the channel state matrix with a channel state vector and to select the transmission terminals based on the comparison result.

The relay also may includes a correlation coefficient calculation unit to calculate a correlation coefficient of each column of the left singular matrix of the channel state matrix and each channel state vector, wherein the transmission terminal selection unit selects the at least one transmission terminal according to a magnitude of the correlation coefficient.

The relay also may include a singular value decomposition unit to perform singular value decomposition with respect to the channel state matrix, where the decoding unit is configured to decode the sum of the terminal data and the base station data using a result of a multiplication of a Hermitian matrix of a left singular vector of the channel state matrix by the received vector.

The relay also may include a singular value decomposition unit to perform singular value decomposition with respect to the channel state matrix, where the transmission unit transmits a result of a multiplication of the sum of the terminal data and the base station data by a left singular matrix of the channel state matrix.

In another general aspect, a base station includes a channel estimation unit to estimate a wireless channel state from a plurality of relay antennas in a relay to a plurality of base station antennas in a base station, and to generate a channel state matrix; a transmission unit to transmit base station data to the relay via the plurality of base station antennas; a receiving unit to receive a sum of the base station data transmitted from the base station and terminal data transmitted from a transmission terminal that is selected from among a plurality of terminals connected to the relay based on a wireless channel state from the plurality of base station antennas to the plurality of relay antennas; and a decoding unit to decode the terminal data based on the channel state matrix.

The base station also may include a singular value decomposition unit to perform singular value decomposition with respect to the channel state matrix, where the transmission unit is configured to transmit a result of a multiplication of a right matrix of the channel state matrix by the base station data.

The base station also may include a singular value decomposition unit to perform singular value decomposition with respect to the channel state matrix, where the decoding unit is configured to decode the terminal data using a result of a multiplication of a Hermitian matrix of a right singular matrix of the channel state matrix by a sum of the terminal data and the base station data.

In yet another general aspect, a data transmission method for a relay station in a wireless communications system includes estimating by a channel estimation unit of the relay a wireless channel state from a plurality of transmission antennas in a base station to a plurality of receiving antennas in a relay; generating by the channel estimation unit of the relay a channel state matrix based on the estimated wireless channel; selecting by a transmission terminal selection unit of the relay at least one transmission terminal from among a plurality of terminals connected to the relay based on the channel state matrix; generating by a receiving unit of the relay a received vector including base station data received from the base station and terminal data received from the at least one transmission terminal; decoding by a decoding unit of the relay a sum of the terminal data and the base station data based on the channel state matrix and the received vector; and transmitting by a transmission unit of the relay a sum of the decoded terminal data and the decoded base station data to both the base station and the transmission terminals.

The method also may include performing by a singular value decomposition unit of the relay singular value decomposition with respect to the channel state matrix; and generating by a channel state vector generation unit of the relay a channel state vector with respect to a wireless channel from the relay to each of the plurality of terminals, where the selecting of the at least one transmission terminal compares each column of a left singular matrix of the channel state matrix with a channel state vector, and selects the at least one transmission terminal based on the comparison result.

The method also may include performing by a singular value decomposition unit of the relay singular value decomposition with respect to the channel state matrix, where the decoding of the sum of the terminal data and the base station data based on the channel state matrix and the received vector further includes decoding the sum of the terminal data and the base station data using a result of a multiplication of a Hermitian matrix of a left singular matrix of the channel state matrix by the received vector.

The method also may include performing by a singular value decomposition unit of the relay singular value decomposition with respect to the channel state matrix, wherein the transmitting of the sum of the decoded terminal data and the base station data to both the base station and the at least one transmission terminal further includes transmitting a result of a multiplication of the sum of the base station data and the terminal data by a left singular matrix of the channel state to both the base station and the at least one transmission terminal.

In yet another general aspect, a terminal data receiving method for a base station in a wireless communications system includes estimating by a channel estimation unit of the base station a wireless channel state from a plurality of relay antennas in a relay to a plurality of base station antennas in a base station; generating by the channel estimation unit of the base station a channel state matrix based on the estimated wireless channel; transmitting by a transmitting unit of the base station base station data to the relay via the plurality of base station antennas; receiving by a receiving unit of the base station a sum of the base station data and terminal data transmitted from a transmission terminal selected from among a plurality of terminals connected to the relay based on a wireless channel from the plurality of base station antennas to the plurality of relay antennas; and decoding by a decoding unit of the base station the terminal data based on the channel state matrix.

The method also may include performing by a singular value decomposition unit of the base station singular value decomposition with respect to the channel state matrix, where the transmitting of the base station data to the relay includes transmitting a result of a multiplication of a right singular matrix of the channel state matrix by the base station data.

The method also may include performing by a singular value decomposition unit of the base station singular value decomposition with respect to the channel state matrix, where the decoding of the terminal includes decoding the terminal data using a result of a multiplication of a Hermitian matrix of a left singular matrix of the channel state matrix by a sum of the terminal data and the base station data.

In yet another general aspect, a computer-readable storage medium storing a program to perform a method of transmitting data for a relay station, comprising instructions to cause a computer to: estimate a wireless channel state from a plurality of transmission antennas in a base station to a plurality of receiving antennas in a relay, and generate a channel state matrix based on the estimated wireless channel; select at least one transmission terminal from among a plurality of terminals connected to the relay based on the channel state matrix from among a plurality of terminals connected to the relay; generate a received vector including base station data received from the base station and terminal data received from the at least one transmission terminals; decode a sum of the terminal data and the base station data based on the channel state matrix and the received vector; and transmit a sum of the decoded terminal data and the decoded base station data to both the base station and the transmission terminals.

In yet another general aspect, a computer-readable storage medium storing a program to perform a method of receiving data for a base station, comprising instructions to cause a computer to: estimate a wireless channel state from a plurality of transmission antennas in a relay to a plurality of receiving antennas in a base station, and generate a channel state matrix based on the estimated wireless channel; transmit base station data to the relay via the plurality of receiving antennas; receive a sum of the base station data and the terminal data transmitted from a transmission terminal selected from among a plurality of terminals connected to the relay based on a wireless channel from the plurality of receiving antennas to the plurality of transmission antennas from among a plurality of terminals connected to the relay; and decode the terminal data based on the channel state matrix.

In yet another general aspect, a terminal for receiving base station data via a relay includes a transmitter to transmit terminal data to the relay; and a receiver to receive, from the relay, a sum of the terminal data and the base station data that is transmitted from a base station, wherein the terminal is selected, as a data reception terminal, from a plurality of access terminals accessing the relay, based on a wireless channel state from a plurality of transmission antennas in the base station to a plurality of receiving antennas in the relay.

The terminal may be selected as the data reception terminal based on the estimated the wireless channel state from the plurality of transmission antennas to the plurality of receiving antennas, a generated channel state matrix based on the estimated wireless channel state, and a result of singular value decomposition of the channel state matrix.

The terminal may be further selected as the data reception terminal based on a channel state vector generated with respect to a wireless channel from the relay to each of the access terminals and according to each column of a left singular matrix of the channel state matrix and the size of a correlation coefficient of the channel state vector.

However, other features and aspects will be apparent from the following description, the drawings, and the claims.

BRIEF DESCRIPTION OF THE DRAWINGS

FIG. 2 is a block diagram illustrating an exemplary wireless channel from a base station to a relay.

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following describes data transmission from a relay to a terminal based on a channel state between a base station and a relay. The detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted to increase clarity and conciseness.

Figure 1A:
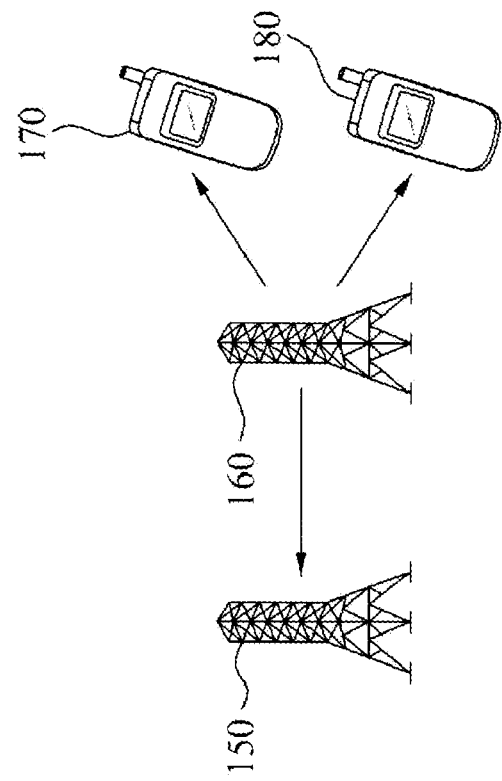
FIGS. 1A and 1B are conceptual diagrams illustrating an exemplary data transmission system transmitting data from a relay to a terminal based on a channel state between a base station and the relay.
Figure 1B:
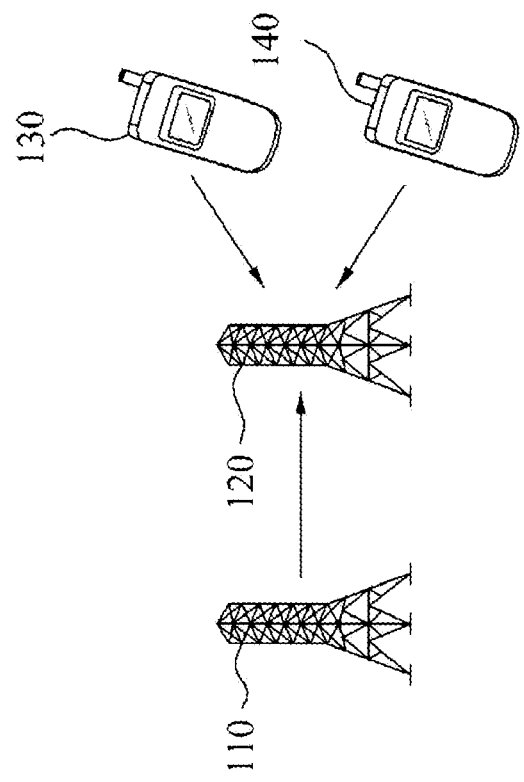

FIGS. 1A and 1B are conceptual diagrams illustrating an exemplary data transmission system transmitting data from a relay to a terminal based on a channel state between a base station and a relay. Hereinafter, the data transmission system is described in detail with reference to FIGS. 1A and 1B. The data transmission system may include base stations 110 and 150, relays 120 and 160, and a plurality of terminals 130, 140, 170, and 180.

FIG. 1A illustrates a relay 120 that receives data from each of a base station 110 and terminals 130 and 140 during a first time slot, and FIG. 1B illustrates a relay 160 that transmits data to a base station 150 and terminals 170 and 180 during a second time slot.

During the first time slot, the relay 120 may estimate the state of wireless channels from the base station 110 to the relay 120, and generate a wireless channel matrix based on the result of the estimations. During the first time slot, the relay 120 may estimate the state of the wireless channels between the terminals 170 and 180 and the relay 120 and generate a wireless channel matrix based on the estimated result.

The relay 120 may receive pilot signals from the base station 110 and estimate a state of a wireless channel from the base station 110 to the relay 120 based on the pilot signals. The relay 120 also may receive pilot signals from terminals 130 and 140 and estimate a state of the wireless channels from terminals 130 and 140 to the relay 120 based on the received pilot signals.

The data transmission illustrated in FIGS. 1A and 1B may use a Time Division Duplex (TDD) technique. In the TDD technique, the base station 110 transmits data to the relay 120 during the first time slot, and the relay 120 transmits data to the base station 110 during the second time slot. A frequency band used by both the base station 110 and the relay 120 for data transmissions is identical.

The state of a wireless channel varies depending on a time and a frequency. Consequently, when the base station 110 and the relay 120 use an identical frequency band, wireless channels ranging from the base station 110 to the relay 120 are identical, and the relay 120 may estimate each state of the wireless channels ranging from the relay 120 to the base station 110 using received pilot signals.

Hereinafter, it is assumed that a data transmission system utilizes the TDD technique; however, the data transmission system also is capable of using other techniques, such as a Frequency Division Duplex (FDD) technique. When a data transmission system utilizes the FDD technique, the base station 110 may estimate a state of each wireless channel ranging from the relay 120 to the base station 110 and also may feedback the estimated wireless channel information to the relay 120. Consequently, the relay 120 may obtain information about the states of wireless channels ranging from the relay 120 to the base station 110.

Both the base station 110 and the relay 120 may transmit data using a plurality of antennas. When both the base station 110 and the relay 120 are equipped with an L number of antennas, wireless channels ranging from the base station 110 to the relay 120 may be expressed by a wireless channel state matrix of size L×L.

The terminals 130 and 140 may connect to the relay 120. The relay 120 may select a transmission terminal to transmit data from among the terminals 130 and 140. The relay 120 may select the transmission terminal based on the wireless channel state matrix of the wireless channels ranging from the base station 110 to the relay 120.

In the second time slot, the relay 160 transmits data to the base station 150 and terminals 170 and 180. The relay 160 may select the terminals 170 and 180 to minimize interference between data streams, the data streams having been transmitted to each of the terminals 170 and 180. When interference occurs between the data streams transmitted to each of the terminals 170 and 180, it is not possible to transmit data to the terminals 170 and 180. However, as described herein, it is possible to transmit data to the base station 150 and the terminals 170 and 180 by selecting the terminals 170 and 180 to minimize interference between data streams.

For example, the relay 120 may receive base station data from the base station 110 and receive terminal data from each of the terminals 130 and 140 during the first time slot. The relay 120 also may transmit the terminal data received from each of the terminals 170 and 180 and transmit base station data from the base station 150 during the second time slot.

FIG. 2 is a diagram illustrating an exemplary wireless channel from a base station to a relay. Hereinafter, the wireless channel in a MIMO environment is described in further detail with reference to FIG. 2.

As shown in FIG. 2, a relay 200 may be equipped with two receiving antennas 211 and 212, and a base station 220 may be equipped with two transmission antennas 221 and 222. However, both the relay and the base station may be equipped with three or more antennas, respectively.

The base station 220 may transmit data to the relay 200 using the transmission antennas 221 and 220, and the relay 200 may receive the transmitted data using the receiving antennas 211 and 212.

The base station 220 may generate a transmission data vector by multiplying a base station data vector that includes data transmitted via the transmission antennas 221 and 222 by a pre-coding matrix. Each element of the transmission data vector may be transmitted via each of the transmission antennas 221 and 222.

The base station 220 may transmit first data to a first receiving antenna 211 of the relay 200 via a first transmission antenna 221. The base station 220 also may transmit second data to a second receiving antenna 212 of the relay 200 via a second transmission antenna 222. When the first data is transmitted to the second receiving antenna 212, or when the second data is transmitted to the first receiving antenna 211, interference may occur between the first data and the second data resulting in loss of efficiency during the data transmission.

In general wireless transmission environments, a transmission path 231 from the first transmission antenna 221 to the first receiving antenna 211 and another transmission path 234 from the second transmission antenna 222 to the second receiving antenna 212 exist. In addition, a transmission path 233 from the first transmission antenna 221 to the second receiving antenna 212 and another transmission path 232 from the second transmission antenna 222 to the first receiving antenna 211 exist. Thus, it is difficult to avoid interference occurring between the first data and the second data transmission.

The base station 220 may determine a pre-coding matrix to improve a data transmission efficiency based on the wireless channel state from the base station 220 to the relay 200. The base station 220 may determine the pre-coding matrix to minimize the interference between the first data and the second data transmissions.

The relay 200 may generate a received vector by receiving base station data transmitted from the base station 220. Assuming that the pre-coding matrix is M, which is multiplied by the base station vector S including each element of the base station data of the base station 220. The received vector received by the relay 200 is determined by the following Equation 1.

$$r = H \cdot M \cdot s \quad \text{[Equation 1]}$$

The relay 200 may generate a decoding vector by multiplying the received vector by a weight matrix. The received vector in Equation 1 assumes only base station signals are received from the base station 220. Assuming that the weight matrix is K, the decoding vector is determined by the following Equation 2.

$$d = K \cdot H \cdot M \cdot s \quad \text{[Equation 2]}$$

To minimize interference between the first data and the second data, K·H·M which is multiplied with the base station vector s may be a diagonal matrix.

Each of the relay 200 and the base station 220 may select a weight matrix and a pre-coding matrix considering a result of a singular value decomposition $H = U\Sigma V^H$ with respect to a channel state matrix H. The relay 200 may select as the weight matrix a Hermitian matrix $U^H$ of a left singular matrix U of the channel state matrix H. The base station 220 may select the pre-coding matrix as a right singular matrix V of the channel state matrix H.

When the relay 200 selects the weight matrix as $U^H$, and the base station 220 selects a pre-coding matrix as V, a decoding vector may be determined by the following Equation 3.

$$d = U^H \cdot U \cdot \sum \cdot V^H \cdot V \cdot s = \sum \cdot S \quad \text{[Equation 3]}$$

Since $\Sigma$ is a diagonal matrix which includes singular values of the channel state matrix H, there is no interference between a first data stream and a second data stream.

Figure 3:
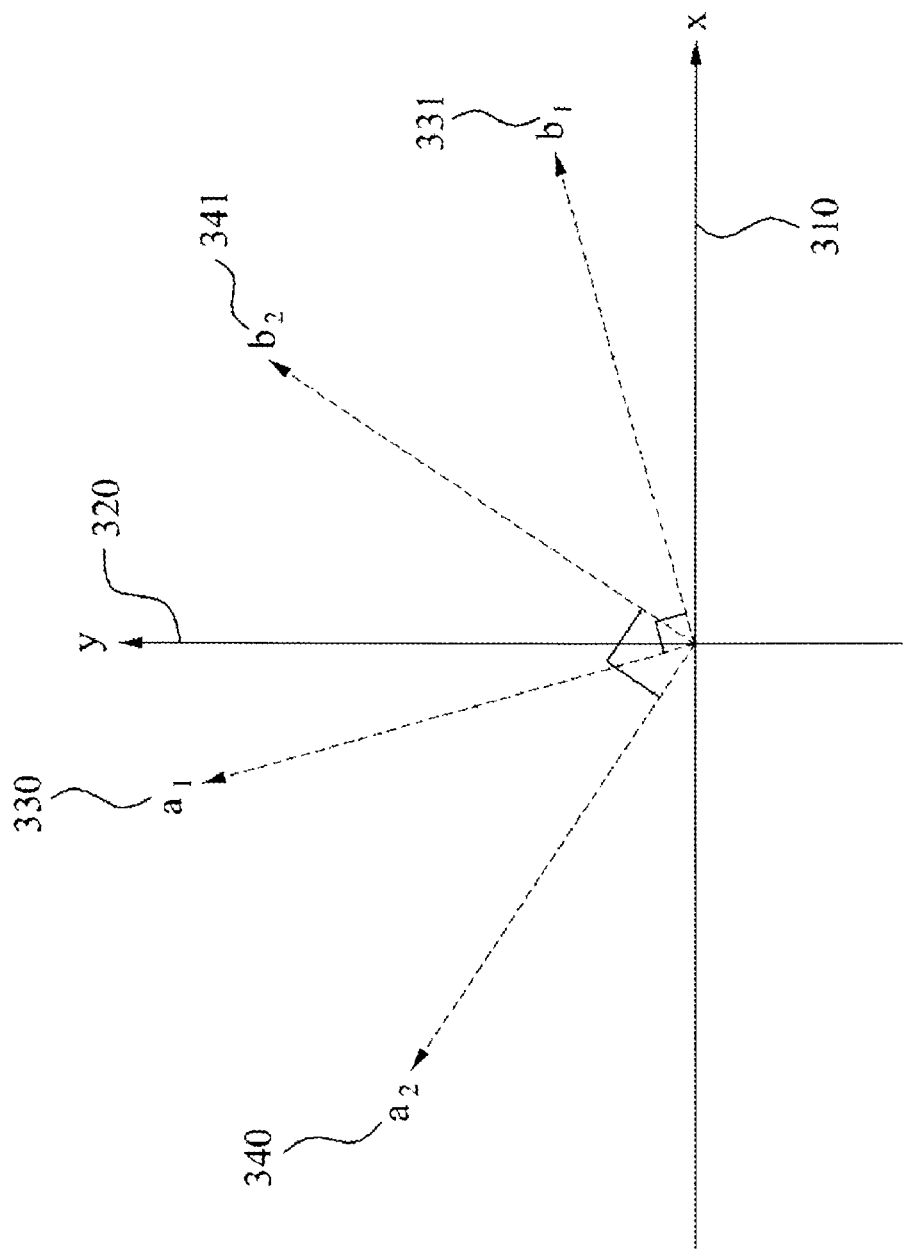
FIG. 3 is a diagram illustrating a plurality of exemplary pairs of vectors which are orthogonal to each other.

FIG. 3 is a diagram illustrating a plurality of exemplary pairs of vectors that are orthogonal to each other. Hereinafter, terminals in which channel vectors are orthogonal to each other from a relay to each terminal being selected as transmission terminals are described in detail with reference to FIG. 3.

FIG. 3 illustrates a two dimensional (2D) vector space. A horizontal axis 310 of FIG. 3 represents a first element, and the vertical axis 320 represents a second element.

In FIG. 3, a vector $a_1$ 330 and $b_1$ 331 are orthogonal to each other. Also, vector $a_2$ 340 and $b_2$ 341 are orthogonal to each other.

Figure 4:
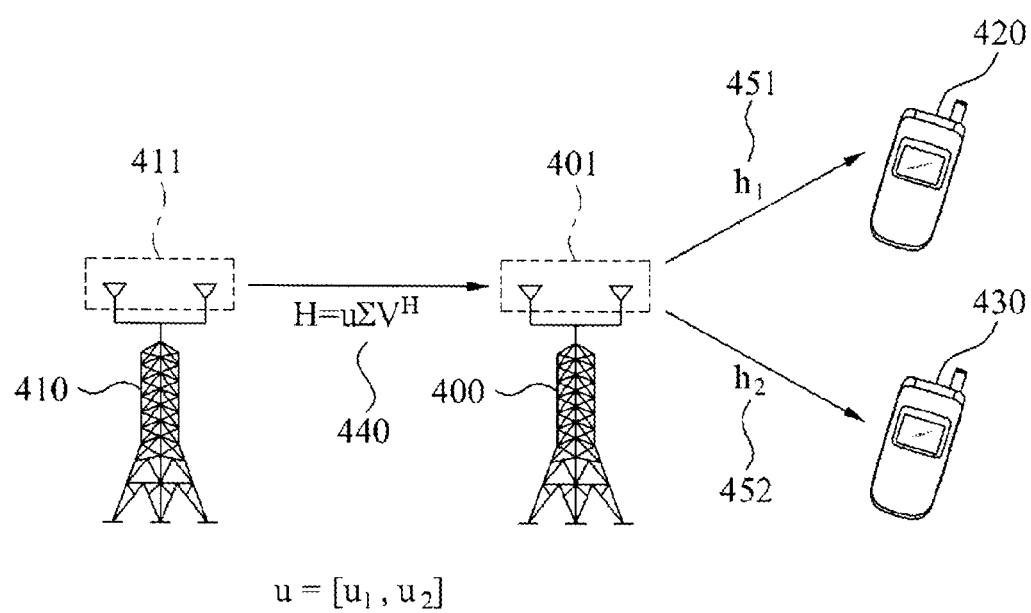
FIG. 4 is a conceptual diagram illustrating an exemplary selection of transmission terminal receiving data from a relay based on a state of a wireless channel with respect to a wireless channel from a base station to the relay.

This illustrates that vector pairs being orthogonal to each other are not unique in a vector space. FIG. 4 illustrates only two vector pairs being orthogonal to each other; however, there may be an infinite number of vector pairs that are orthogonal to each other. FIG. 4 is a conceptual diagram illustrating an exemplary transmission terminal being selected, the transmission terminal receiving data from a relay based on a wireless channel state with respect to a wireless channel from a base station to the relay. Hereinafter, transmitting data to a transmission terminal selected from a plurality of terminals are described in detail with reference to FIG. 4.

Assume that a relay 400 is equipped with a plurality of receiving antennas 401, and each of the terminals 420 and 430 is equipped only with one antenna. Wireless channels from the relay 400 to each of the terminals 420 and 430 are vector channels. Also, assume that the base station 410 is equipped with a plurality of transmission antennas 411.

The relay 400 may generate channel state vectors 451 and 452 by estimating the wireless channels from the relay 400 to each of the terminals 420 and 430. The relay 400 may select transmission terminals. The relay 400 may select terminals in which channel state vectors 451 and 452 are orthogonal with each other.

Referring to FIG. 3, there may be plural pairs of terminals in which wireless channel vectors are orthogonal with each other.

The relay 400 may generate the channel state matrix 440 by estimating the wireless channels from the base station 410 to the relay 400. The relay 400 may perform singular value decomposition with respect to the channel state matrix 440 to obtain a left singular matrix for the channel state matrix 440. The relay 400 may select terminals having a channel state vector most similar to each column of a left singular matrix as the transmission terminals.

The relay 400 may determine the similarity of two vectors using a correlation coefficient between the two vectors. That is, the greater the correlation coefficient between the two vectors is, the greater the similarity is between the two vectors located in a similar location in a vector space. Thus, the relay 400 may calculate the correlation coefficient between each column of the left singular matrix for the channel state matrix and each channel state vector and select the terminal having the highest correlation coefficient as the transmission terminal corresponding to the channel state vector.

The left singular matrix for the channel state matrix 440 is a unitary matrix, thus each column vector of the left singular matrix is orthogonal to another. When the channel state vectors 451 and 452 of the transmission terminals 420 and 430 are similar to each column vector of the left singular matrix, each of the channel state vectors 451 and 452 of the transmission terminals 420 and 430 are orthogonal to another.

Consequently, from among channel state vector pairs that are orthogonal to each other, the relay 400 may select terminals as the transmission terminals 420 and 430 corresponding to the channel state vector pairs 451 and 452 having similarities to each of column vectors of the left singular vectors of the channel state matrix.

Figure 5:
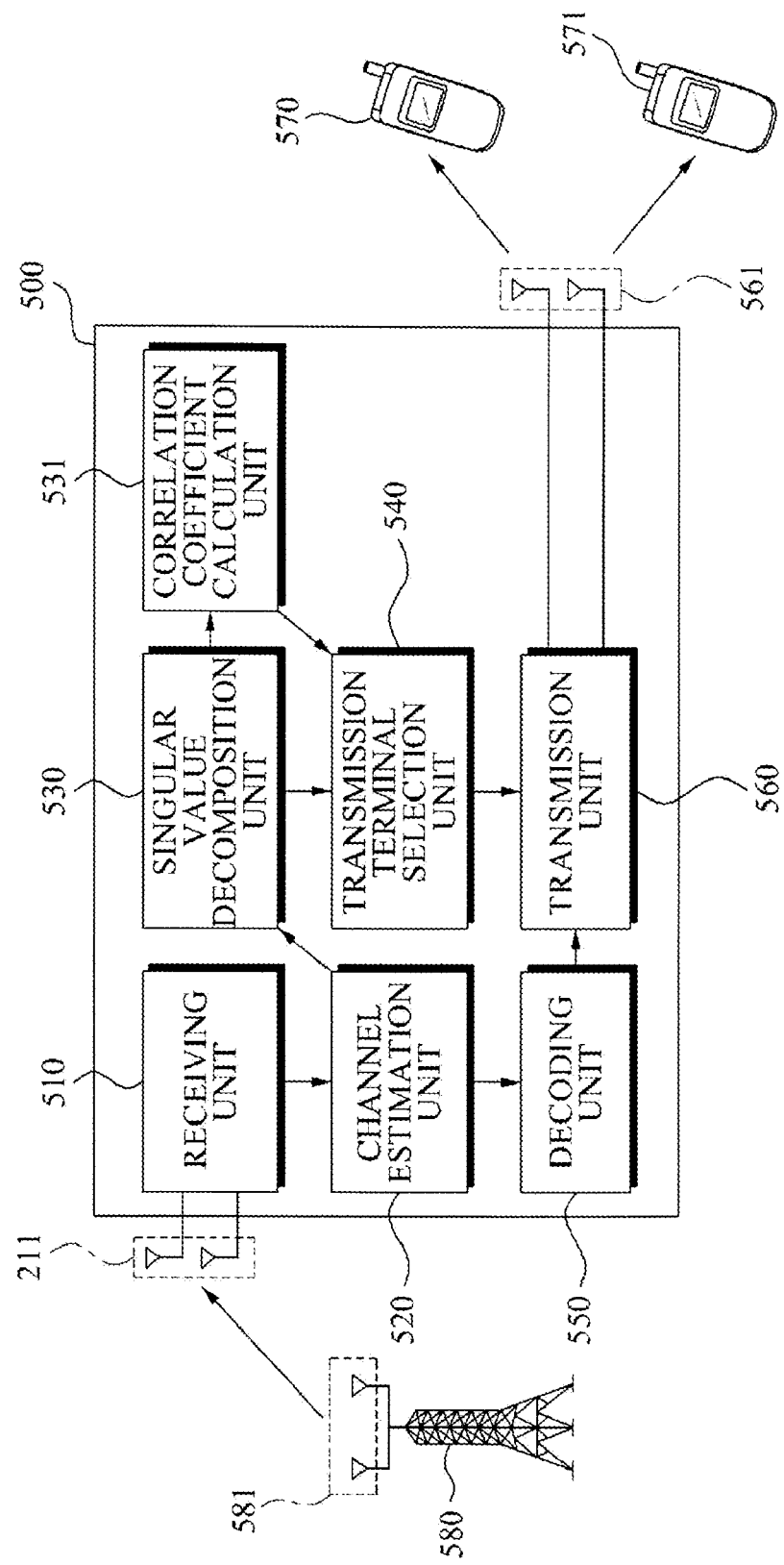
FIG. 5 is a block diagram illustrating an exemplary structure of a relay transmitting data to a terminal based on a state of a channel from a base station to the relay.

FIG. 5 is a block diagram illustrating an exemplary structure of a relay for transmitting data to a terminal based on a channel state between a base station and the relay. As shown in FIG. 5, a relay 500 may include a receiving unit 510, a channel estimation unit 520, a singular value decomposition unit 530, a transmission terminal selection unit 540, a correlation coefficient calculation unit 531, a decoding unit 550 and a transmission unit 560.

The channel estimation unit 520 may estimate a wireless channel state from a plurality of transmission antennas 581 of a base station 580 to a plurality of receiving antennas 511 of the relay 500 and generate a channel state matrix based on the estimated wireless channel state.

The transmission terminal selection unit 540 may select at least one transmission terminal from among multiple terminals 570 and 571 connected to the relay 500. The transmission terminal selection unit 540 may select a transmission terminal based on a channel state matrix from the base station 580 to the relay 500.

The receiving unit 510 may receive terminal data from the transmission terminals 570 and 571 and receive the base station data from the base station 580 during a first time slot. The receiving unit 510 may generate a received vector including the terminal data and the base station data.

The receiving unit 510 may receive pilot signals from the plurality of transmission antennas 581 of the base station 580, and the channel estimation unit 520 may generate a channel state matrix based on each of the pilot signals. Also, the receiving unit 510 may receive the pilot signals from the transmission terminals 570 and 571 and may estimate the wireless channel from transmission terminals 570 and 571 to the relay 500.

The decoding unit 550 may decode a sum of terminal data and a sum of base station data based on the channel state matrix and the received vector.

The transmission unit 560 may transmit a sum of the decoded terminal data and the base station data to the base station 580 and also transmit a sum of decoded terminal data and the base station data to the transmission terminals.

The singular value decomposition unit 530 may perform singular value decomposition with respect to the channel state matrix from the base station 580 to the relay 500.

Assuming the channel state matrix from the base station 580 to the relay 500 is H, a result of the singular value decomposition of the channel state matrix H may be described as the following Equation 4.

$$H = U\Sigma V^H$$ [Equation 4]

where U is a left singular matrix with respect to a channel state matrix H, V is a right singular matrix with respect to the channel state matrix H, and a superscript H refers to a Hermitian operator. $\Sigma$ is a diagonal matrix including singular values of the channel state matrix H.

The channel state vector $h_1$ represents a channel state vector with respect to a wireless channel from the relay 500 to a first terminal 570 connected to the relay 500, and the channel state vector $h_2$ represents a channel state vector with respect to a wireless channel from the relay 500 to the second terminal 571 connected to the relay 500.

The transmission terminal selection unit 540 may compare each column of the left singular matrix U of the channel state matrix H with each of the channel state vectors $h_1$ and $h_2$, and may select a transmission terminal based on the comparison results.

The left singular matrix U with respect to the channel state matrix H may be expressed in a column vector as the following Equation 5.

$$U = [u_1 u_2 \ldots u_L]$$ [Equation 5]

The correlation coefficient calculation unit 531 may calculate a correlation coefficient between each of columns $u_1$, $u_2$, ..., and $u_L$ of the left singular matrix of the channel state matrix and each of channel state vector $h_1$ and $h_2$. The transmission terminal selection unit 540 may select a transmission terminal depending on the correlation coefficient.

The transmission terminal selection unit 540 may select a terminal in which a higher correlation coefficient in each column of the left singular matrix as the transmission terminal. When the correlation coefficient between two vectors is high, the two vectors are similar. Thus, the transmission terminal selection unit 540 may select a terminal having a channel state vector similar to each column of the left singular matrix as the transmission terminal. When each of column vectors which comprise the left singular matrix are orthogonal with each other, the channel state vectors corresponding to the selected transmission terminal 570 and 571 are orthogonal to each other.

The relay 500 may be equipped with an L number of receiving antennas, and the transmission terminal selection unit 540 may select an L number of transmission terminals.

A received vector r generated by the receiving unit 510 receiving base station data and terminal data may be expressed as the following Equation 6.

$$r = H \cdot V \cdot s + \sum_{i=1}^{L} h_i \cdot t_i + n$$ [Equation 6]

where s represents a base station data vector that includes base station data. V is a right singular matrix for the channel state matrix H, and V is pre-coded by the base station data vector. $h_i$ represents a channel state vector with respect to a wireless channel from the relay 500 to an $i_{th}$ terminal. $t_i$ is terminal data which is transmitted from the $i_{th}$ terminal to the relay 500, and n is a thermal noise vector.

The decoding unit 550 may generate a decoding vector that includes a sum of terminal data and base station data using multiplication of the Hermitian matrix $U^H$ of the left singular matrix of the channel state matrix H by the received vector. The decoding vector may be expressed as the following Equation 7.

$$d = U^H \cdot \left( H \cdot V \cdot s + \sum_{i=1}^{L} h_i \cdot t_i + n \right)$$ [Equation 7]

The $i_{th}$ element of the decoding vector includes the base station data received by an $i_{th}$ transmission antenna of the base station 580 and the terminal data received from an $i_{th}$ transmission terminal.

The $i_{th}$ element $d_i$ of the decoding vector may be expressed as the following Equation 8.

$$d_i = \lambda_i \cdot s_i + u_i^H \cdot h_i \cdot t_i + \sum_{j=1, j \neq i}^{L} u_i^H \cdot h_j \cdot t_j + \tilde{n}_i$$ [Equation 8]

where $\lambda_i$ is an $i_{th}$ singular value of the channel state matrix H, and $S_i$ is the $i_{th}$ element of the base station vector s and represents the base station data transmitted via the $i_{th}$ the base station antenna. $u_i$ is an $i_{th}$ column vector of the left singular matrix U of the channel state matrix H. $\tilde{n}_i$ is the $i_{th}$ element of multiplication of a the thermal noise vector n with the Hermitian matrix $U_H$ of the right singular matrix of the channel state matrix H.

The transmission terminal selection unit 540 may select a terminal having the channel state vector similar to each column of the left singular matrix as a transmission terminal. Assuming that each of the column vectors consisting the left singular vector are orthogonal to each other, it may be assumed that $u_i^H \cdot h_j = 0$, where $i \neq j$. Thus, the $i_{th}$ element, $d_i$ of the decoding vector may be expressed as the following Equation 9.

$$d_i = \lambda_i \cdot s_i + u_i^H \cdot h_i \cdot t_i + \tilde{n}_i$$ [Equation 9]

The $i_{th}$ element, $d_i$ of the decoding vector includes the base station data received from the base station and an $i_{th}$ terminal data received from an $i_{th}$ transmission terminal, and does not include other terminal data received from other transmission terminals.

The transmission unit 560 may transmit a decoding vector including a sum of the base station data and the terminal data to both the base station 580 and the transmission terminals 570 and 571.

The transmission unit 560 may transmit the multiplication of the base station data by the sum of the terminal data and the left singular matrix of the channel state matrix both to the base station 580 and the transmission terminals 570 and 571. The multiplication of the sum of the base station data and the terminal data by the left singular matrix of the channel state matrix transmitted from the transmission unit 560 may be determined by the following Equation 10.

$$x_t = U \cdot (a \cdot s + b \cdot t)$$ [Equation 10]

where $x_t$ is a signal transmitted from a relay, s is base station data and, and t is terminal data. a and b refer to an electrical power difference between the base station data s and the terminal data t. U is a pre-coding matrix when the relay transmits data.

Figure 6:
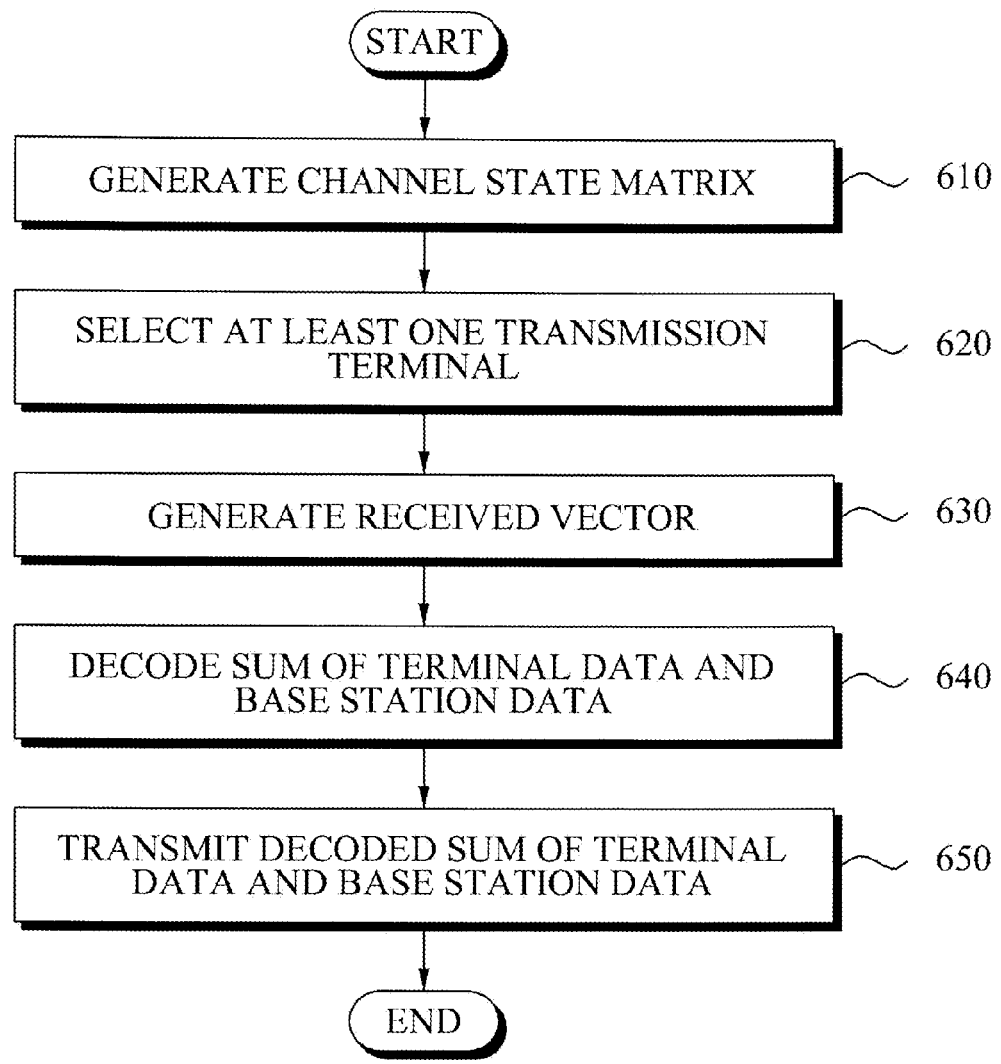
FIG. 6 is a flowchart illustrating an exemplary data transmission method to select a transmission terminal based on a wireless channel from a base station to a relay and transmit data to the selected transmission terminal.

FIG. 6 is a flowchart illustrating an exemplary data transmission method which selects a transmission terminal based on a wireless channel from a base station to a relay and transmits data to the selected transmission terminal. Hereinafter, the data transmission method is described in detail with reference to FIG. 6.

A relay may estimate a wireless channel state from a plurality of transmission antennas in a base station to a plurality of receiving antennas in a relay and generate a channel state matrix based on the estimated wireless channel state (610). The relay may receive pilot signals from the base station and estimate a wireless channel state based on the received pilot signals.

The relay may generate estimate a wireless channel state from the relay to the terminal and generate a channel state vector.

The relay performs singular value decomposition with respect to the channel state matrix. From the result of the singular value decomposition, the relay may obtain a right singular matrix and a left singular matrix for the channel state matrix.

The relay may select at least one transmission terminal from among a plurality of terminals connected to the relay based on the channel state matrix (620).

A transmission terminal may be selected by comparing each column of the left singular matrix of the channel state matrix to a channel state vector of each terminal (620).

A correlation coefficient between two vectors represents a similarity between the two vectors. A high correlation coefficient may denote that the two vectors exist in a similar location in a vector space. The relay may select terminals having a channel state vector similar to the each column of the left singular matrix of the channel state matrix as transmission terminals. Column vectors of the left singular matrix of the channel state matrix are orthogonal to each other since the channel state vectors of the terminals are orthogonal to each other as well.

The relay may receive terminal data from the transmission terminal, and receive base station data from the base station. The relay may generate a received vector including the terminal data and the base station data (630).

The relay may decode a sum of the terminal data and the base station data based on the channel state matrix and the received vector (640).

The relay may decode the decoded sum of the terminal data and the base station data using a multiplication of a Hermitian matrix of the left singular matrix of the channel state matrix by the received vector.

The decoded sum of the terminal data and the base station data may be transmitted to the base station, and the decoded sum of the terminal data and the base station data may be transmitted to the transmission terminals (650).

The base station may receive the sum of the terminal data and the base station data. The base station data received in the base station is the same data transmitted by the base station to the relay in operation. Consequently, the base station is already aware of the base station data values. The base station may receive only the terminal data by removing the base station data from the sum of the base station data and the terminal data.

The terminal also may receive the sum of the terminal data and the base station data and may obtain the base station data by removing the base station data from the sum of the base station data and the terminal data.

The multiplication of the sum of the base station data and the terminal data by the left singular matrix of the channel state matrix may be transmitted to the base station and the transmission terminals (650).

Figure 7:
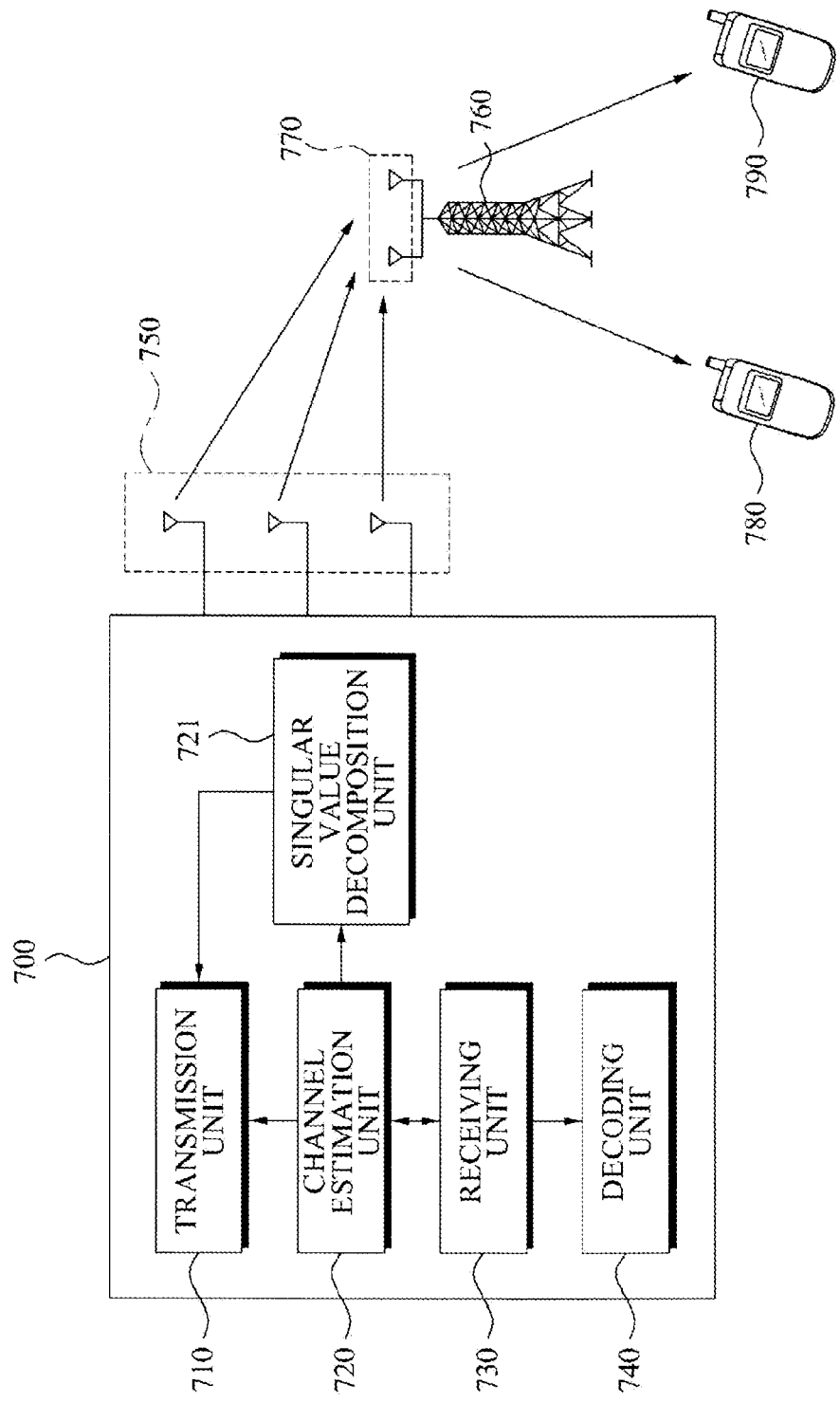
FIG. 7 is a block diagram illustrating an exemplary structure of a base station apparatus.

FIG. 7 is a block diagram illustrating an exemplary structure of a base station apparatus. Hereinafter, operations of the base station apparatus are described in detail with reference to FIG. 7. A base station apparatus 700 may include a transmission unit 710, a channel estimation unit 720, a receiving unit 730, and a decoding unit 740.

The channel estimation unit 720 may estimate a wireless channel from a plurality of transmission antennas 770 in a relay 760 to a plurality of receiving antennas 750 in a base station. The channel estimation unit 720 may generate a channel state matrix based on the estimated wireless channel state. The channel state matrix from the plurality of transmission antennas 770 in the relay 760 to the plurality of receiving antennas 750 in the base station 700 is a Hermitian matrix with respect to the channel state matrix of the wireless channel from the plurality of receiving antennas 750 in the base station to the plurality of transmission antennas 770 in the relay.

The singular value decomposition unit 721 may perform singular value decomposition with respect to the channel state matrix. By performing singular value decomposition, a left singular matrix and a right singular matrix for the channel state matrix may be generated.

The transmission unit 710 may transmit the base station data to the relay 760 via the receiving antennas 750.

The transmission unit 710 may transmit multiplication of the right singular matrix of the channel state matrix by the base station data.

The receiving unit 750 may receive the base station data from the base station 700 and receive terminal data from the transmission terminals 780 and 790. The transmission terminals 780 and 790 are terminals selected based on the wireless channels from the receiving antennas 750 in the base station 700 to the transmission antennas 770 in the relay 760.

The relay 760 may decode a sum of the base station data and the terminal data. The relay 760 may not be aware of an exact base station data value or an exact terminal data value, but may be aware of the sum of the base station data and the terminal data. The relay 760 may transmit the sum of the base station data and the terminal data to both the base station 700 and the transmission terminals 780 and 790.

The receiving unit 730 may receive the sum of the base station data and the terminal data from the relay 760.

Referring to Equation 10, the received vector $r_B$ which includes a sum of base station data and terminal data received in the receiving unit 750 from the relay 760 may be expressed by the following Equation 11.

$$r_B = H^H \cdot U \cdot (a \cdot s + b \cdot t) + n_B \quad \text{[Equation 11]}$$

where $n_B$ is thermal noise vector.

(1) The decoding unit 740 may perform decoding of the terminal data based on the channel state matrix. The terminal data may be decoded using multiplication of the Hermitian matrix of a right singular matrix of the channel state matrix by the sum of the terminal data and the base station data.

(2) The decoded data may include the terminal data and the base station data. Since the base station data included in the decoded data is the same data transmitted by the transmission unit 710 to the relay 760, the base station 700 is already aware of the data values. Consequently, the decoding unit 740 may obtain the terminal data values based on the base station data values.

(3) The decoding unit 740 may generate a decoding vector including the sum of the terminal data and the base station data, using the multiplication of the Hermitian matrix $V^H$ of the right singular matrix of the channel state matrix H by the sum of the terminal data and the base station data. The decoding vector $d_B$ may be expressed using the following Equation 12.

(4)

$$d_B = V^H \cdot H^H \cdot U \cdot (a \cdot s + b \cdot t) + \tilde{n}_B \quad \text{[Equation 12]}$$

where $\tilde{n}_B$ is multiplication of the Hermitian matrix $V^H$ of the right singular matrix of the channel state matrix H by the thermal noise vector $n_B$.

An $i_{th}$ element of the decoding vector includes the base station data transmitted by an $i_{th}$ antenna of the base station and the terminal data received from an $i_{th}$ transmission terminal.

The $i_{th}$ element $d_{Bi}$ of the decoding vector may be expressed by the following Equation 13.

$$d_{Bi} = \lambda_i \cdot (a \cdot s_i + b \cdot t_i) + \tilde{n}_{bi} \quad \text{[Equation 13]}$$

where $\lambda_i$ is an $i_{th}$ singular value of the channel state matrix H. $S_i$ is an $i_{th}$ element of the base station vector s and is the base station data transmitted by an $i_{th}$ base station antenna. $l_i$ is the terminal data received by an $i_{th}$ transmission terminal, and $\tilde{n}_{bi}$ is the $i_{th}$ element of $\tilde{n}_B$.

Since the base station 700 is aware of the base station vector element of $S_i$, $t_i$ may be calculated using Equation 13. The base station may employ interference cancellation for the purpose of calculating $t_i$.

Figure 8:
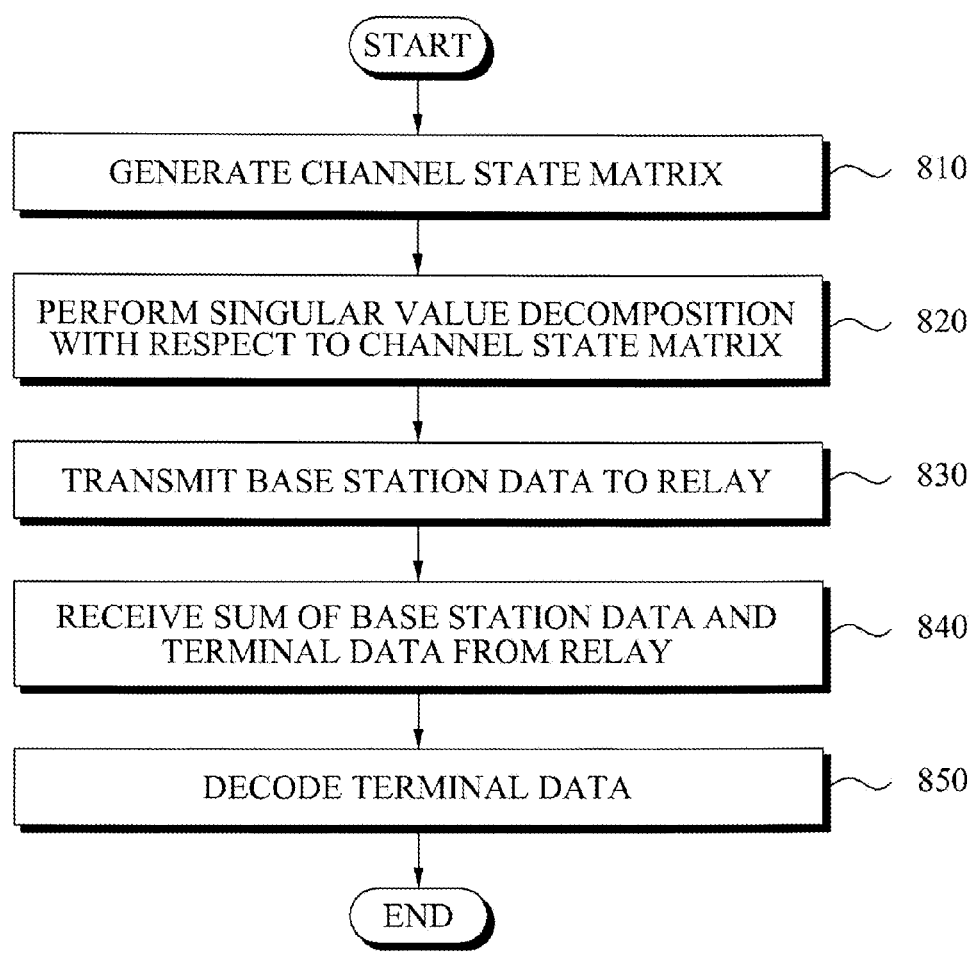
FIG. 8 is a flowchart illustrating an exemplary method for receiving data via a relay from a terminal.

FIG. 8 is a flowchart illustrating an exemplary data receiving method from a terminal via a relay. Hereinafter, the data receiving method is described in detail with reference to FIG. 8.

A base station may estimate a wireless channel state from a plurality of transmission antennas in a relay to a plurality of receiving antennas in a base station (810). The base station may generate a channel state matrix based on the estimated wireless channel state.

The base station may receive pilot signals, and using the received pilot signals, the wireless channel state from the plurality of antennas in the relay to the plurality of receiving antennas in the base station may be estimated.

The base station may perform singular value decomposition with respect to the channel state matrix (820). By performing singular value decomposition, the base station may obtain a left singular matrix and a right singular matrix with respect to the channel state matrix.

The base station may transmit the base station data to the relay using the receiving antennas (830). The base station may transmit a multiplication of the right singular matrix of the channel state matrix by base station data.

The base station may receive a sum of the terminal data and the base station data from the relay (840). The transmission terminal may transmit the terminal data to the relay and the relay may transmit the terminal data to the base station. The relay may select a transmission terminal among the plurality of terminals connected to the relay. The relay may select the transmission terminal based on the wireless channel from the plurality of receiving antennas in the base station to the plurality of transmission antennas in the relay.

The base station may decode a sum of the terminal data and the base station data (850). The terminal data may be decoded using multiplication of a Hermitian matrix of the right singular matrix of the channel state matrix and the sum of the terminal data and the base station data (850).

A result of the decoding may include the terminal data and the base station data. The base station data included in the result of the decoding is data transmitted to the relay by the base station (830). Consequently, the base station may obtain the terminal data values by referring to the base station values.

Figure 9:
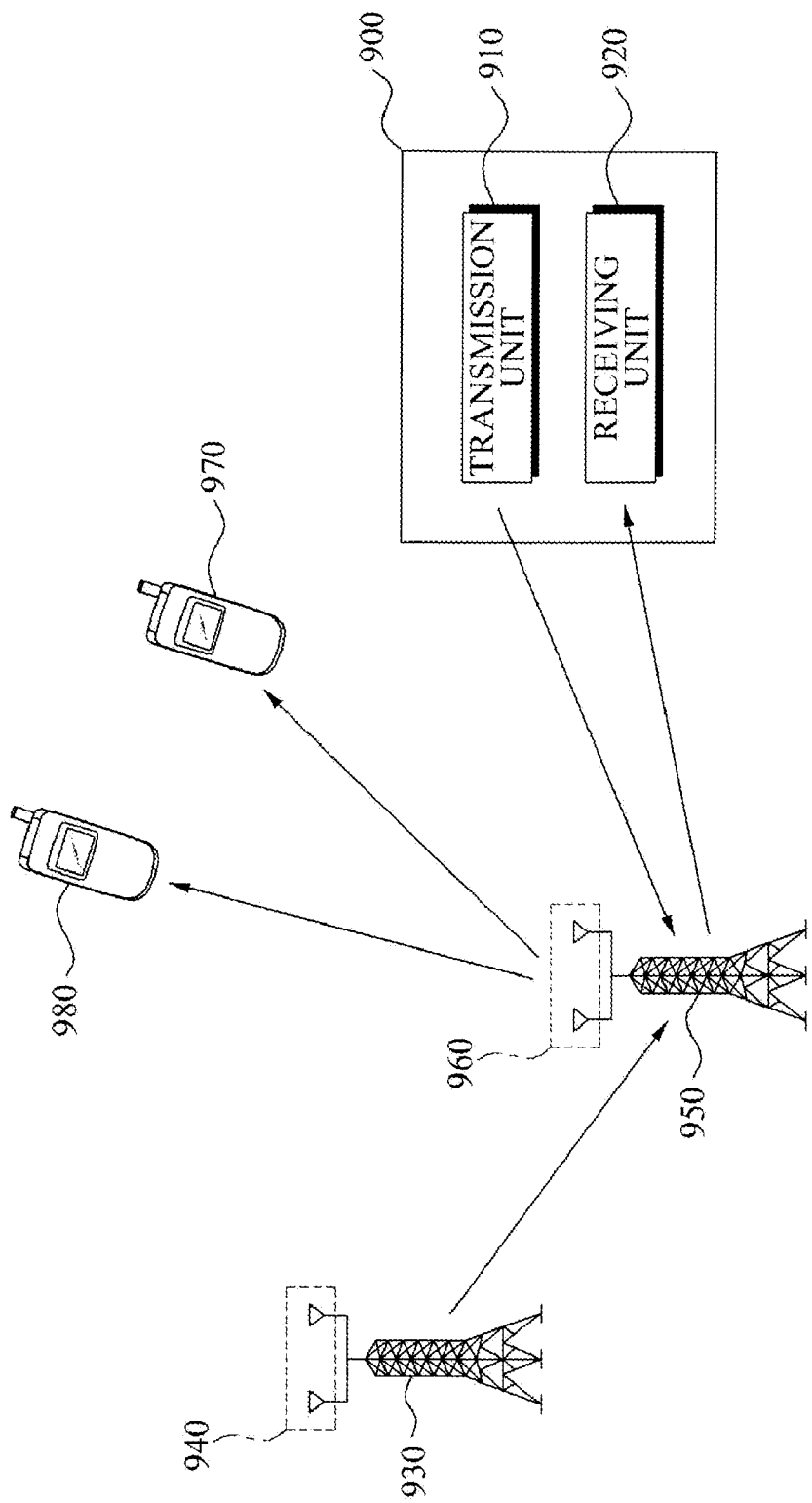
FIG. 9 is a block diagram illustrating an exemplary structure of a terminal.

FIG. 9 is a block diagram illustrating an exemplary structure of a terminal 900. Hereinafter, an operation of the terminal 900 is described in detail with reference to FIG. 9. The terminal 900 may include a transmitter 910 and a receiver 920.

The terminal 900 may receive base station data from a base station 930 via a relay 950.

The transmitter 910 may transmit terminal data to the relay 950. The transmitter 910 may transmit pilot signals to the relay 950. The relay 950 may receive the pilot signals via a plurality of receiving antennas 960. The relay 950 may generate a channel state vector with respect to a wireless channel from the terminal 900 to each of the receiving antennas 960.

The relay 950 may receive the base station data from the base station 930. The relay 950 may generate a received vector including a sum of the base station data and the terminal data. The relay 950 may estimate a wireless channel state from a plurality of transmission antenna 940 to the plurality of receiving antennas 960 and generate a channel state matrix based on the estimated wireless channel state. The relay 950 may decode the sum of the terminal data and the base station data based on the channel state matrix and the received vector. The relay 950 may transmit the decoded sum of the terminal data and the base station data to the terminal 950.

The receiver 920 may receive the sum of the base station data and the terminal data from the relay 950.

A plurality of access terminals 900, 970, and 980 may access the relay 950. The relay 950 may select a data reception data from the plurality of access terminals 900, 970, and 980, and transmit the data to the selected data reception terminal. The relay 950 may select an access terminal that may enhance a data transmission efficiency as the data reception terminal.

The relay 950 may select a data reception terminal based on a wireless channel state from the plurality of transmission antennas 940 in the base station 930 to the plurality of receiving antennas 960 in the relay 950. The relay 950 may estimate the wireless channel state from the plurality of transmission antennas 940 to the plurality of receiving antennas 960 and generate the channel state matrix based on the estimated wireless channel state.

The relay 950 may select a data reception terminal according to a result of the singular value decomposition of the channel state matrix.

The relay 950 may estimate a wireless channel state from the relay 950 to each of the access terminals 900, 970, and 980 and generate a channel state vector based on the estimated wireless channel state. The relay 950 may calculate each column of a left singular matrix of a channel state matrix and a correlation coefficient of each channel state vector and select a data reception terminal based on the size of the calculated correlation coefficient.

The data transmission method may be recorded in computer-readable media including program instructions to implement various operations embodied by a computer. The media may also include, alone or in combination with the program, instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

A number of examples have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal data receiving method for a base station in a wireless communications system, the method comprising:
    estimating by a channel estimation unit of the base station a wireless channel state from a plurality of relay antennas in a relay to a plurality of base station antennas in a base station;
    generating by the channel estimation unit of the base station a channel state matrix based on the estimated wireless channel;
    transmitting by a transmitting unit of the base station base station data to the relay via the plurality of base station antennas;
    receiving by a receiving unit of the base station a sum of the base station data and terminal data transmitted from a transmission terminal selected from among a plurality of terminals connected to the relay based on a wireless channel from the plurality of relay antennas to the plurality of base station antennas; and
    decoding by a decoding unit of the base station the terminal data based on the channel state matrix.

2. The method of claim 1, further comprising:
    performing by a singular value decomposition unit of the base station singular value decomposition with respect to the channel state matrix,
    wherein the transmitting of the base station data to the relay includes transmitting a result of a multiplication of a right singular matrix of the channel state matrix by the base station data.

3. The method of claim 1, further comprising:
    performing by a singular value decomposition unit of the base station singular value decomposition with respect to the channel state matrix,
    wherein the decoding of the terminal includes decoding the terminal data using a result of a multiplication of a Hermitian matrix of a left singular matrix of the channel state matrix by a sum of the terminal data and the base station data.

* * * * *